Jan. 24, 1939. S. T. WILLIAMS ET AL 2,144,952
CHECK VALVE
Filed May 22, 1937
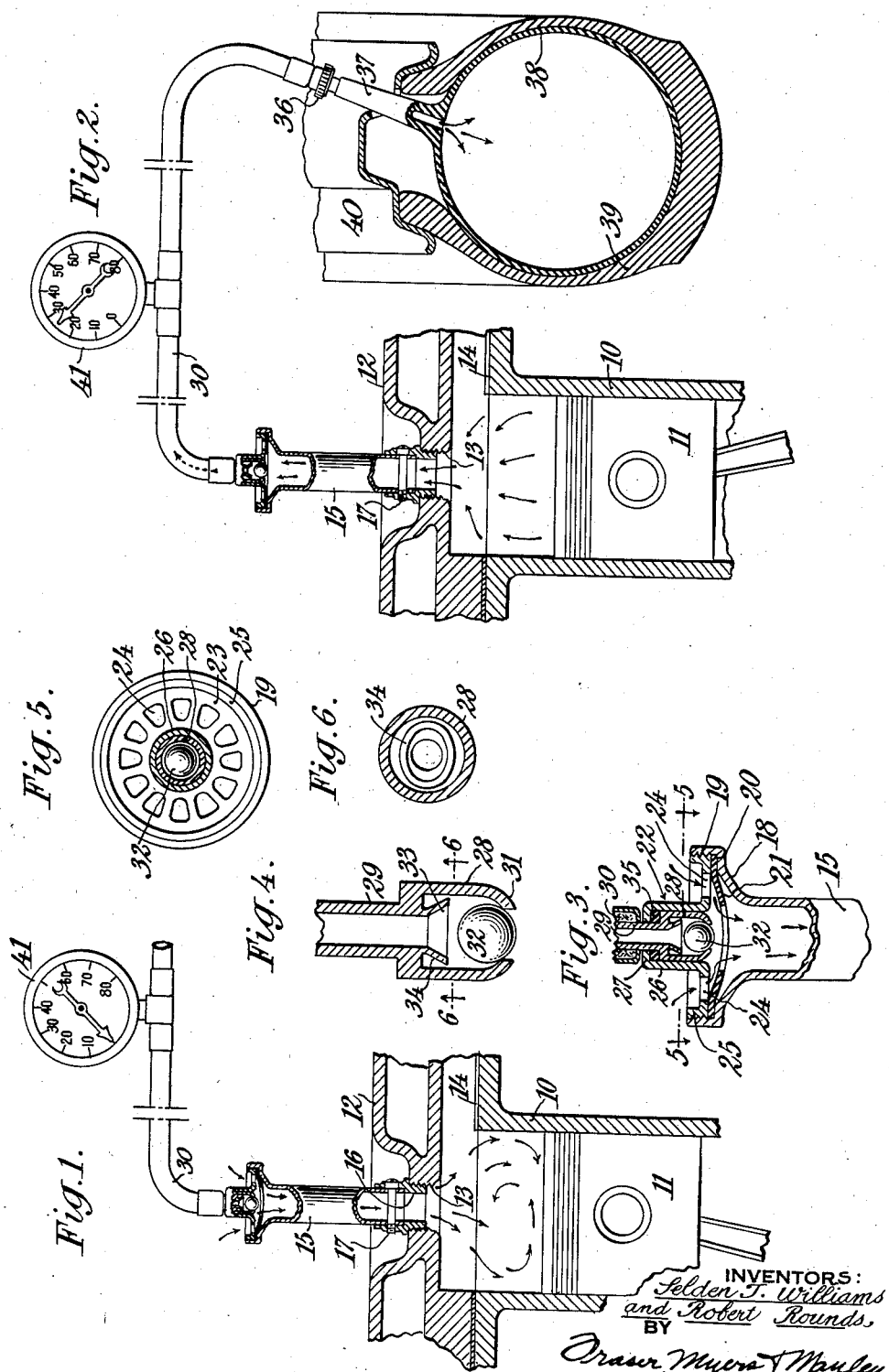
INVENTORS:
Selden T. Williams
and Robert Rounds,
BY
Fraser, Myers & Manley
ATTORNEYS.

Patented Jan. 24, 1939

2,144,952

UNITED STATES PATENT OFFICE 2,144,952

CHECK VALVE

Selden T. Williams, Bellerose, and Robert Rounds, Brooklyn, N. Y., assignors to Scovill Manufacturing Company, Waterbury, Conn., a corporation of Connecticut Application May 22, 1937, Serial No. 144,124

1 Claim. (Cl. 251—121)

The present invention relates to a fluid pressure pump, and more particularly to one wherein the actual pumping operation is performed by the movement of a piston in one of the cylinders of an internal combustion engine.

Fluid pressure pumps of this general type are known and have been used with varying degrees of success for the emergency inflation of tires of motor vehicles. The primary objection thereto has been that gasolene and oil from the engine are entrapped with the air delivered by the pump to the tire, the deleterious effects of which substances on the inner tube of a tire being well known.

The present invention contemplates a pump of this type which will deliver fresh air free from contamination with gasolene or oil, so that these objectionable substances will not be introduced into a tire when the air delivered by the pump is used for that purpose, or when air pressure so produced is used to clean away dust, crumbs, etc., from the upholstery of a car, oil will not be discharged upon, and stain such upholstery.

The present invention primarily consists of a casing having special forms of check valves therein, a fitting carried by the casing adapted for engagement in the spark plug opening of an engine cylinder, and a conduit leading from said casing and having at its free end a hose coupling, air nozzle or the like. Of these check valves the air inlet valve consists of a housing in which a thin disk of rubber, "Neoprene" or the like, is peripherally held and operates on the suction or intake stroke of the piston to admit atmospheric air freely into the engine cylinder, and on the compresison stroke operates to promptly and tightly close said intake valve to prevent the discharge of the air therethrough. The air outlet valve preferably consists of a ball check contained within a housing having two spaced seats, one of which is adapted to receive the ball on the suction stroke, and the other adapted to receive the ball on the compression stroke, said latter seat being so formed as to permit air to pass around the ball and into the conduit to the tire or other outlet. The invention also includes other features of novelty and combinations of parts, as will be more apparent from the detailed description which follows, when considered in connection with the accompanying drawing showing a preferred embodiment of the invention, and wherein:—

Figure 1 is a view, partly in section and partly in elevation, of a fluid pressure pump embodying our invention and showing the position of the check valves at the intake or suction stroke of the engine cylinder.

Fig. 2 is a view similar to Fig. 1, showing the position of the valves at the compression stroke of the cylinder, the conduit being shown as connected to a pneumatic tire.

Fig. 3 is an enlarged sectional view of the valves of the fluid pressure pump.

Fig. 4 is an enlarged view of the discharge valve of the pump.

Fig. 5 is a section taken along the plane of the line 5—5 of Fig. 3.

Fig. 6 is a section taken along the plane of the line 6—6 of Fig. 4.

Referring to the drawing, the fluid pressure pump in its entirety may be said to consist of an engine cylinder 10 having a reciprocable piston 11 therein, a cylinder head 12 having a spark plug opening 13 and a combustible mixture intake opening 14 therein, the latter leading to a manifold and carburetor (not shown). The specific form, dimensions and construction of the engine cylinder per se forms no part of the present invention.

The fluid pressure pump unit to which the present invention is specifically directed, may be normally carried in the tool box of an automobile and is intended to be used only when one desires to inflate a tire, clean the upholstery of the car, or provide a source of compressed air for use with a spray gun or the like. It primarily consists of a substantially cylindrical casing 15, open at its opposite ends and carrying at one end a detachable fitting or adapter 16 which is externally screw-threaded for engagement in the spark plug opening 13 in the cylinder head. Any means may be provided for detachably connecting the fitting 16 to the casing 15, and as herein shown the fitting is formed with an enlarged internal bore and shoulder to receive one end of the casing and provided with diametrically-aligned openings for accommodating a securing bolt 17 adapted to pass through complementally aligned openings in the end of the casing 15. The casing 15 at its opposite end is flared outwardly, as indicated at 18, and terminates in a cylindrical flange 19, which is here shown as internally screw-threaded and providing a shoulder or seat 20 for a flexible valve disk 21. For securing the valve disk to the casing and to provide a closure seat for said disk, there is provided a clamping member 22 having a flat closure wall 23 formed with a plurality of radial openings 24 therein, the said closure wall at its outer periphery being formed with an upwardly-extending annular ring 25 which is externally screw-threaded to engage the threads in the flange 19, and at its inner periphery is formed with a cylindrical wall 26, which, at its outer end, is formed with an inwardly-directed flange 27.

The flexible valve disk 21 is preferably formed of "Neoprene" or other suitable composition which is not attacked by gasolene or oil, and is of a width to normally overlie the openings 24 in the closure wall 23 and has a central opening of a diameter approximately equal to that of the bore through the casing 15. The disk 21 is peripherally held upon its seat 20 by the clamping member 22 but is free to flex inwardly into the flared enlargement of the casing by the pressure of atmospheric air when the pressure within the casing 15 is reduced to sub-atmospheric pressure, as best shown in Fig. 3.

Mounted within the cylindrical portion 26 of the clamping member 22 is a discharge valve consisting of a housing 28 having an outer cylindrical wall snugly fitting within the wall 26 and adapted for relative rotation with respect thereto, said housing at one end having a reduced, outwardly-extending axial nipple portion 29, to which a flexible hose or conduit 30 may be secured, and at its other end being cupped inwardly, as at 31, to provide a seat for a ball valve 32 contained within the housing. Within the housing 28 and spaced rearwardly from the seat 31 is a second valve seat 33 formed on a reentrant flange 34. The valve seat 33 is preferably so formed that when the ball 32 seats thereagainst it will not provide a complete closure but will provide by-passes for the air around the valve. To accomplish this, the reentrant flange 34, which is normally of truly conical form, is deformed to provide a seat of substantially elliptical form, as best shown in Fig. 6.

The valves 21 and 32 are preferably coaxially mounted, and also substantially concentrically disposed. To facilitate mounting of the fitting 16 in the spark plug opening in the cylinder head, a swivel connection is provided between the casing and the housing 28 by the flange 27 on the clamping member being turned-in over the shoulder on the housing 28. To insure against leakage of air through the swivel connection, a packing ring 35 is disposed between the complemental parts thereof.

The free end of the hose or conduit may be provided with any suitable fitting, such, for example, as a pump connection 36, where the fluid pressure pump is intended for connection with a tire valve stem 37 on an inner tube 38 contained within a tire casing 39 mounted on a wheel rim 40. In order that the pressure within the tire may be known while inflating the same, a pressure gauge 41 of any preferred construction may be connected within the conduit 30.

When it is desired to use the fluid pressure pump of the present invention for any desired purpose, one of the spark plugs from an engine cylinder will be removed, the fitting or adapter 16 on the pump is then screwed into the spark plug opening and the fitting at the free end of the conduit connected to a tire valve or the like. The engine is then run slowly, whereupon at the suction or intake stroke of the piston 11, as shown in Fig. 1, the intake valve disk 21 will be unseated and fresh atmospheric air will enter and fill the engine cylinder. Simultaneously with this action the ball valve 32 will be seated by gravity, or by any pressure within the conduit 30. Inasmuch as the intake manifold leading to the various cylinders of the engine will be under suction, whereas the cylinder to which the pump is connected will not be under so high a degree of suction, a combustible mixture of gasolene and air will not be drawn into the cylinder to which the pump is connected. On the compression stroke of the piston the disk valve 21 will close and the built-up air pressure in the cylinder will move the ball valve 32 from its seat 31 to its seat 33 and permit the compressed air to pass around said ball valve into the nipple 29, thence into the conduit 30, and from there into the tire. As the engine is operated the valves 21 and 32 will alternately open and close, and pressure can thereby be built up in the tire or other reservoir, the degree of which will be indicated by the gauge 41 in the conduit 30. This pressure may be read while pumping, and the lowest reading of the vibrating gauge hand will be the approximate tire pressure. Because of the freedom of operation and the lack of restriction in the intake valve 21, the total area of the openings 24 being far greater than the cross-sectional area of the intake opening 14, little or no gas from the intake manifold enters the cylinder on the intake stroke. Further, because of the slight reduction in pressure in the cylinder on the intake stroke, little, if any, oil accumulates above the piston. Actual test with devices as herein described has proved that no oil or gasolene is delivered to the tire or other reservoir from the pump. This is highly important, since, as is well known, gasolene and oil have deleterious effects upon rubber inner tubes; oil will also stain the vehicle upholstery where a device of this kind is used to deliver a blast of air for cleaning dust, crumbs, etc., from the interior of an automobile.

The top pressure that can be secured with an apparatus of this type approaches the top compression pressure of the engine on which it is used, and although such pressure will vary with different engines, in general it is around 75 pounds per square inch, which is considerably in excess of the normal pressures now employed in vehicle tires.

From the foregoing detailed description it will be apparent that we have provided a simple, practicable and compact unit, which, when used in conjunction with an engine cylinder, provides a highly efficient fluid pressure pump; and although we have disclosed but a single preferred embodiment of our invention, it is to be understood that we do not wish to be limited to the details of construction herein set forth, since it will be apparent to those skilled in the art that changes therein may be made without departing from the spirit of the invention.

What we claim is:

A fluid pressure valve comprising a one-piece housing formed at one end with an internal shoulder having an axial circular opening therethrough and formed inwardly from said end with an integral reentrant substantially elliptical flange facing said shoulder, a ball valve within said housing adapted to seat alternately on said shoulder and on the face of said elliptical flange, said ball valve when seating on the shoulder providing a complete closure for the opening therein, and when seating on the elliptical flange providing by-passes around the ball valve.

SELDEN T. WILLIAMS.
ROBERT ROUNDS.